Oct. 9, 1956
H. KATZUNG
2,766,035
WHEEL SUSPENSION
Filed Oct. 1, 1952
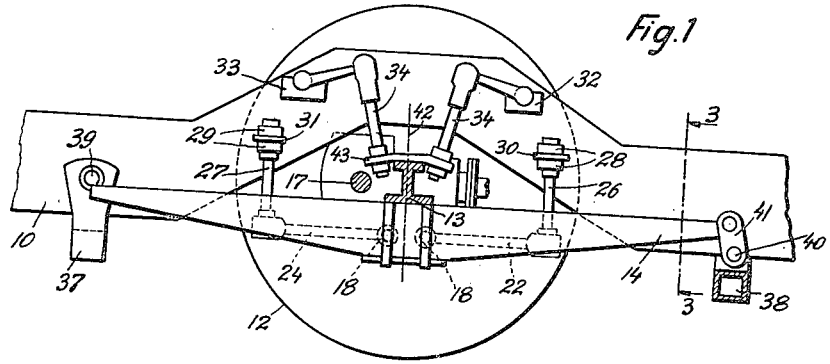
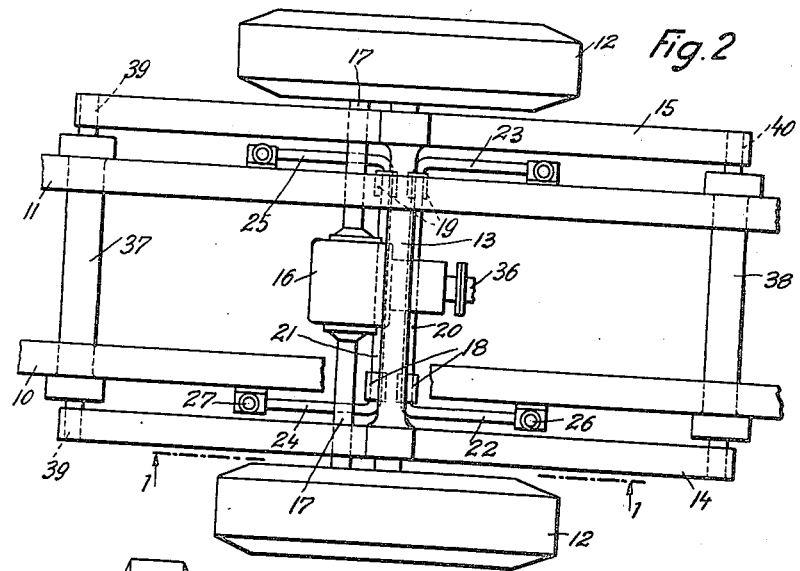
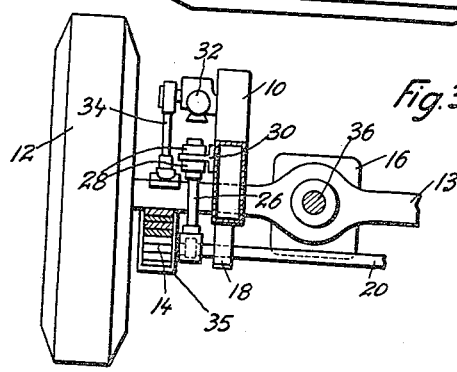
Inventor
Hugo Katzung
By Dicke & Padlen
Attorneys

United States Patent Office 2,766,035
Patented Oct. 9, 1956

2,766,035
WHEEL SUSPENSION

Hugo Katzung, Stuttgart-Vaihingen, Germany, assignor to Daimler-Benz Aktiengesellschaft, Stuttgart-Unterturkheim, Germany Application October 1, 1952, Serial No. 312,586

2 Claims. (Cl. 267—8)

The present invention relates to a wheel suspension for a vehicle and, more particularly, to the arrangement of the springs of a heavy duty vehicle or bus provided with torsional stabilizer springs.

It is the object of the present invention to provide a wheel suspension resulting in improved riding qualities and in a more favorable disposition of the springs of the vehicle and in an improved transfer of the weight of the vehicle to the axle and the wheels. More especially it is the object of the invention to equip the vehicle with stabilizer spring rods which are so disposed as not to occupy any valuable space between the longitudinal frame beams leaving such space free for other purposes. Further objects of the invention will appear from the description of a preferred embodiment thereof which is illustrated in the accompanying drawings for the purpose of explanation rather than limitation of the invention. In the drawings:

Fig. 1 is a partial side view of the chassis provided with the improved wheel suspension partly shown in section along the line 1—1 of Fig. 2, Fig. 2 is a plan view thereof, and Fig. 3 is the section taken along the line 3—3 of Fig. 1.

An axle 13 on which a pair of wheels 12 is journalled carries two parallel longitudinal leaf springs 14, 15 between the ends thereof, said springs extending fore and aft and being connected by straps 35 to the bottom of the axle 13 which has an I-shaped profile. Each of the wheels is formed with an internal gear not shown meshing with a pinion not shown fixed to the end of a shaft 17 which extends parallel to the axle 13 into a transmission housing 16 and is adapted to be driven by an engine through the intermediary of a driving shaft 36. The transmission housing 16 is attached to the shaft 13.

A chassis composed of two parallel longitudinal beams 10 and 11 spaced a distance considerably less than the springs 14 and 15 and of transverse beams, such as 37 and 38, is supported by the ends of the springs 14 and 15 in a manner well known in the art. For that purpose, the upturned ends of the beam 37 are formed with trunnions 39 engaging eyes with which the springs are formed. Similar trunnions 40 fixed to the ends of the beam 38 are connected with the springs 14, 15 by shackles 41.

For the purpose of the present invention a pair of brackets 18 is attached to the axle 13 beneath the longitudinal beam 10 and extends downwardly forming journals, the axes of which are equally spaced from the central vertical plane of the axle indicated by the dash-dotted line 42 in Fig. 1. A similar pair of brackets 19 is attached to the axle 13 beneath the longitudinal beam 11. A torsional spring rod 21 is journalled in the rear pair of brackets 18, 19 and a similar torsional spring rod 20 is journalled in the front pair of brackets 18, 19. The ends of the spring rods projecting outwardly from the brackets are formed with integral horizontal arms 22, 23, 24, 25 extending away from the axle 13 equal distances being located immediately adjacent to the springs 14, 15 on the inside thereof. The ends of the arms are connected by substantially vertical links 26 and 27 to lateral brackets 30 and 31 mounted on the outer faces of the respective longitudinal beams 10, or 11 respectively. Preferably, resilient cushions 28 and 29 are interposed between the links and the brackets 30, 31 in a known manner. Moreover, two pairs of shock absorbers 32, 33 are provided, one pair being mounted on either side of the chassis frame 10, 11. The shock absorbers constituting each pair are positioned symmetrically with respect to the vertical central plane 42 of the axle 13, as will appear from Fig. 1. The arms of the shock absorbers are connected by links 34 to a bracket 43 mounted on the top face of the axle 13.

The operation of the novel wheel suspension is as follows:

When both wheels are displaced equal amounts upwardly or downwardly relative to the chassis frame 10, 11, the leaf springs 14, 15 only will be flexed, while the torsional spring rods 20, 21 are freely turned in their brackets 18, 19 without being subjected to any torsional stress. Should the chassis tend, however, to lean over to one side whereby different relative displacements take place between the two wheels and the chassis, torsional stresses will be set up in the rods 20 and 21 and such stresses will counteract the relative inclination of the axle to the chassis.

Thus, it is an essential feature of the present invention that the two torsional spring rods extend parallel and substantially symmetrically to the plane 42 whereby the forces produced in operation are uniformly distributed and whereby each of the two torsional spring rods may have comparatively small dimensions, even though considerable stabilizing forces will be produced. Moreover, it will be noted that the parallel stabilizer spring rods are provided in addition to the main springs, such as the leaf springs 14, 15, and will become effective to counteract any inclination only of the axle relative to the chassis, but will not counteract any up-and-down movement of the axle. Therefore, the stabilizer springs will greatly improve the riding quality of the vehicle in curves.

Moreover, it will be noted that the disposition of the stabilizer spring rods is particularly favorable, since the spring rods are mounted on the axle, their ends being connected with the chassis. In that manner, the spring rods will not occupy any valuable space and, more particularly, no space between the longitudinal beams of the chassis so that the space therebetween may be used for other purposes.

While a preferred embodiment of the present invention has been described, it is to be clearly understood that the same is in no way limited to the details described, but is capable of numerous modifications within the scope of the appended claims.

What I claim is:

1. In a vehicle, the combination comprising a pair of wheels, a common axle carried by said wheels, a pair of longitudinal leaf springs, said leaf springs being carried between the ends thereof by said axle at opposite ends of the axle, a chassis frame supported at the ends of said leaf springs, a pair of torsional stabilizer rods rotatably mounted on opposite sides of said axle in substantially symmetrical relationship with respect to the central vertical plane of said axle, each stabilizer rod having arms at the ends thereof extending horizontally in a direction away from said axle, links connecting the ends of said arms to said chassis frame, two pairs of shock absorbers, one pair mounted on either side of said chassis frame, the shock absorbers constituting each pair being positioned on opposite sides of said axle symmetrically with respect to said vertical central plane of said axle, and links connecting said shock absorbers to said axle at opposite sides thereof.

2. In a vehicle, the combination according to claim 1 wherein said first-mentioned links are substantially vertical and are resiliently connected to said chassis frame.

References Cited in the file of this patent

UNITED STATES PATENTS

| | | |
|---|---|---|
| 164,202 | Paris | June 8, 1875 |
| 2,152,661 | Paton | Apr. 4, 1939 |
| 2,179,016 | Leighton | Nov. 7, 1939 |
| 2,226,047 | Borgward | Dec. 24, 1940 |
| 2,253,646 | Paton | Aug. 26, 1941 |

FOREIGN PATENTS

| | | |
|---|---|---|
| 110,464 | Australia | Apr. 26, 1940 |
| 149,718 | Great Britain | Aug. 26, 1920 |
| 683,405 | France | Mar. 3, 1930 |
| 776,294 | France | Oct. 31, 1934 |